United States Patent
Masuda et al.

(10) Patent No.: US 7,844,433 B2
(45) Date of Patent: Nov. 30, 2010

(54) SYSTEM, METHOD AND PROGRAM FOR DESIGNING A UTILITY FACILITY AND METHOD FOR MANUFACTURING A PRODUCT BY THE UTILITY FACILITY

(75) Inventors: Toshikatsu Masuda, Yokohama (JP); Toshinori Shinki, Tokyo (JP); Shuichi Samata, Yokohama (JP); Yuuichi Mikata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1127 days.

(21) Appl. No.: 11/510,601

(22) Filed: Aug. 28, 2006

(65) Prior Publication Data

US 2007/0061049 A1 Mar. 15, 2007

(30) Foreign Application Priority Data

Sep. 12, 2005 (JP) ............................ P2005-263519

(51) Int. Cl.
G06F 17/50 (2006.01)
(52) U.S. Cl. .......................................... 703/13; 716/19
(58) Field of Classification Search .................. 703/13; 709/19

See application file for complete search history.

(56) References Cited

U.S. PATENT DOCUMENTS

| | | | | |
|---|---|---|---|---|
| 5,539,652 | A * | 7/1996 | Tegethoff | 703/14 |
| 5,694,325 | A * | 12/1997 | Fukuda et al. | 700/121 |
| 5,719,796 | A * | 2/1998 | Chen | 703/13 |
| 6,394,670 | B2 * | 5/2002 | Ogata et al. | 396/611 |
| 6,467,077 | B1 * | 10/2002 | Dean | 716/19 |
| 6,532,182 | B2 * | 3/2003 | Ogawa et al. | 365/201 |
| 6,671,570 | B2 * | 12/2003 | Schulze | 700/121 |
| 6,728,590 | B1 * | 4/2004 | Dean | 700/121 |
| 6,766,212 | B1 * | 7/2004 | Dean | 700/121 |
| 6,788,985 | B2 | 9/2004 | Mitsutake et al. | |
| 6,801,826 | B2 * | 10/2004 | Tanabe | 700/121 |
| 6,879,884 | B2 | 4/2005 | Miyashita et al. | |
| 6,983,191 | B2 | 1/2006 | Mikata | |
| 7,018,855 | B2 * | 3/2006 | Kota et al. | 438/14 |
| 7,113,838 | B2 * | 9/2006 | Funk et al. | 700/108 |
| 7,115,424 | B2 * | 10/2006 | Nakao | 438/5 |
| 7,218,983 | B2 * | 5/2007 | Puri et al. | 700/112 |
| 7,463,939 | B1 * | 12/2008 | Mata et al. | 700/100 |
| 7,512,454 | B1 * | 3/2009 | Li et al. | 700/97 |
| 2003/0045961 | A1 * | 3/2003 | Nakao | 700/121 |
| 2005/0171627 | A1 * | 8/2005 | Funk et al. | 700/121 |

OTHER PUBLICATIONS

T. Masuda, et al., "Virtual Fab Technology Utility Simulation and Its Application to 300mm CR Facility Design and Energy Reduction", ISSM 2005, Sep. 13-15, 2005.

Y. Mikata, "Problems on Highly efficient, man-product and small amount production—for low cost, QTAT and countermeasure for global warming," SEMI Forum Japan 2005, Jun. 8, 2005, pp. 79-94.

* cited by examiner

*Primary Examiner*—Dwin M Craig
(74) *Attorney, Agent, or Firm*—Finnegan, Henderson, Farabow, Garrett & Dunner, L.L.P.

(57) ABSTRACT

A system for designing a utility facility includes a state analyzer analyzing operational states of tools included in a production line, an extraction module extracting an operational period and a standby period of each of the tools, a calculator calculating changes in a quantity of utilities consumed by the tools in operation and in standby, based on the operational periods and the standby periods, and a facility design module designing at least any of a utility facility for supplying utilities to the tools and a utility facility for disposing of utilities discharged from the tools.

20 Claims, 13 Drawing Sheets

FIG. 2

PRODUCT A   x WAFERS/MONTH
PRODUCT B   y WAFERS/MONTH
PRODUCT C   z WAFERS/MONTH

FIG. 3

| PRODUCT | PROCESS STEP | TOOL | PROCESSING TIME (min.) |
|---|---|---|---|
| A | SA1 | M1 | $a_1$ |
|   | SA2 | M2 | $a_2$ |
|   | ⋮ | ⋮ | ⋮ |
| B | SB1 | M1 | $b_1$ |
|   | SB2 | M3 | $b_2$ |
|   | ⋮ | ⋮ | ⋮ |
| C | SC1 | M2 | $c_1$ |
|   | SC2 | M3 | $c_2$ |
|   | ⋮ | ⋮ | ⋮ |

FIG. 4

| TOOL | NUMBER |
|---|---|
| M1 | i |
| M2 | j |
| M3 | k |

FIG. 5

| TOOL | FREQUENCY | TIME FOR MAINTENANCE (min.) | MTBF (hr.) | MTTR (min.) |
|---|---|---|---|---|
| M1 | ONE DAY | 90 | 700 | 150 |
| M2 | 50 LOTS | 180 | 1200 | 240 |
| M3 | SEVEN DAYS | 90 | 900 | 120 |

FIG. 13A

| PRODUCT A₁ | x₁ WAFERS/MONTH |
| PRODUCT B₁ | y₁ WAFERS/MONTH |

FIG. 13B

| PRODUCT A₂ | x₂ WAFERS/MONTH |
| PRODUCT B₂ | y₂ WAFERS/MONTH |

FIG. 14A

| PRODUCT | PROCESS STEP | TOOL | PROCESSING TIME (min.) |
|---|---|---|---|
| A₁ | SA11 | M10 | $a_{11}$ |
|  | SA12 | M20 | $a_{12}$ |
|  | ⋮ | ⋮ | ⋮ |
| B₁ | SB11 | M10 | $b_{11}$ |
|  | SB12 | M30 | $b_{12}$ |
|  | ⋮ | ⋮ | ⋮ |

FIG. 14B

| PRODUCT | PROCESS STEP | TOOL | PROCESSING TIME (min.) |
|---|---|---|---|
| A₂ | SA21 | M10 | $a_{21}$ |
|  | SA22 | M20 | $a_{22}$ |
|  | ⋮ | ⋮ | ⋮ |
| B₂ | SB21 | M10 | $b_{21}$ |
|  | SB22 | M30 | $b_{22}$ |
|  | ⋮ | ⋮ | ⋮ |

FIG. 15

| TOOL | NUMBER |
|------|--------|
| M10  | l      |
| M20  | m      |
| M30  | n      |

FIG. 16

| TOOL | FREQUENCY | TIME FOR MAINTENANCE (min.) | MTBF (hr.) | MTTR (min.) |
|------|-----------|-----------------------------|------------|-------------|
| M10  | ONE DAY   | 90                          | 700        | 150         |
| M20  | 50 LOTS   | 180                         | 1200       | 240         |
| M30  | SEVEN DAYS| 90                          | 900        | 120         |

FIG. 17

| | |
|---|---|
| PRODUCT $A_1$ | $x_1$ WAFERS/MONTH |
| PRODUCT $B_1$ | $y_1$ WAFERS/MONTH |
| PRODUCT $A_2$ | $x_2$ WAFERS/MONTH |
| PRODUCT $B_2$ | $y_2$ WAFERS/MONTH |

FIG. 18

| PRODUCT | PROCESS STEP | TOOL | PROCESSING TIME (min.) |
|---|---|---|---|
| $A_1$ | SA11 | M10 | $a_{11}$ |
| | SA12 | M20 | $a_{12}$ |
| | ⋮ | ⋮ | ⋮ |
| $B_1$ | SB11 | M10 | $b_{11}$ |
| | SB12 | M30 | $b_{12}$ |
| | ⋮ | ⋮ | ⋮ |
| $A_2$ | SA21 | M10 | $a_{11}$ |
| | SA22 | M20 | $a_{12}$ |
| | ⋮ | ⋮ | ⋮ |
| $B_2$ | SB21 | M10 | $b_{11}$ |
| | SB22 | M30 | $b_{12}$ |
| | ⋮ | ⋮ | ⋮ |

SYSTEM, METHOD AND PROGRAM FOR DESIGNING A UTILITY FACILITY AND METHOD FOR MANUFACTURING A PRODUCT BY THE UTILITY FACILITY

CROSS REFERENCE TO RELATED APPLICATIONS AND INCORPORATION BY REFERENCE

This application is based upon and claims the benefit of priority from prior Japanese Patent Application P2005-263519 filed on Sep. 12, 2005; the entire contents of which are incorporated by reference herein.

BACKGROUND OF THE INVENTION

1. Field of the Invention

The present invention relates to facility design technology, particularly for a system, a computer implemented method and a computer program product for designing a utility facility, based on utility consumption of a production line.

2. Description of the Related Art

In the case of the related art, quantities of utilities, such as electricity and gases, which are used by tools for the production of products, are calculated by multiplying utility specification for usage of each tool, by corresponding coefficients (load factors), respectively. As is often the case, the utility specifications of each of the tools demand utilities larger than utilities actually consumed during operation. As a result, the total capacity for a designed utility facility is larger than the total quantity of utilities consumed by each of the tools included in the production line during operation.

As is often the case, the load factors are determined based on the experience of persons in charge of facility design. Usually, load factors tend to be surplus so that undersupply of respective utilities does not occur. The quantities of utility demanded, which have been calculated with surplus load factors, respectively, largely deviate from quantities of utilities consumed during actual operation. As a result, a utility facility with an unnecessarily large size is designed.

A utility facility once included in the factory is not capable of low capacity operation by reducing quantities of utilities to be supplied. For such reason, regardless of the quantities of utilities consumed by each of the tools and the number of products processed during actual operation, the utility facility continues operating with the designed quantities of utilities. Accordingly, running costs are kept almost constant. In a case where large utility specifications for usage are calculated, compared with utilities consumed during actual operations, the excessive capacity of the utility facility is large. For example, a production line for wafers, each with a diameter of 300 mm, indicates extremely large utility specifications, and the excessive capacity of a utility would be larger than ever. In this case, running costs become increased, and there also exists a problem from the viewpoint of energy savings when actual consumption is less than designed capacity.

The reduction of quantities has been examined for the quantity of utilities consumed by each of the tools included in the production line. However, the reduction of the quantities of utilities consumed by each of the tools and in the facility is within an excessive surplus set during the design of the utility facility. Thus, it is difficult to estimate how much effect will be achieved by reducing utilities in each of the tools. As a result, the reduced quantities of the utility have not been employed in the design stage of the utility facility.

As for an example similar to the foregoing explanation, the following method has been proposed. In such method, quantities of utilities consumed by each of the tools are calculated by a simulation using a virtual production line, and quantities of utilities to be supplied to a production line are determined. While the foregoing method can be applied to a production line already manufacturing products, the method cannot be applied to a production line in a production planning phase. Moreover, in the case of the foregoing method, a state in which each of the tools is in operation and a state in which the tools are in standby is not discriminated from each other. This makes it impossible to estimate accurate quantities of utilities to be respectively supplied.

SUMMARY OF THE INVENTION

An aspect of the present invention inheres in a system for designing a utility facility. The system includes a state analyzer configured to analyze operational states of a plurality of tools included in a production line for producing products, respectively, each of the operational states being assumed based on production information of the products; an extraction module configured to extract an operational period and a standby period of each of the tools, based on a result of the state analysis; a calculator configured to calculate changes in a quantity or an amount of utilities consumed by each of the tools with respect to time, based on quantities of utilities consumed by each of the tool in operation and in standby during the operational periods and the standby periods; and a facility design module configured to design at least any of a utility facility for supplying utilities to each of the tools and a utility facility for disposing of utilities discharged from each of the tools, based on the changes in the quantity of utilities consumed by the tools.

Another aspect of the present invention inheres in a computer implemented method for designing a utility facility. The method includes analyzing operational states of a plurality of tools included in a production line for producing products, respectively, each of the operational states being assumed based on production information of the products; extracting an operational period and a standby period of each of the tools, based on a result of the state analysis; calculating changes in a quantity of utilities consumed by each of the tools with respect to time, based on quantities of utilities consumed by each of the tools in operation and in standby during the operational periods and the standby periods; and designing at least any of a utility facility for supplying utilities to each of the tools and a utility facility for disposing of utilities discharged from each of the tools, based on the changes in the quantity of utilities consumed by the tools.

Still another aspect of the present invention inheres in a method for manufacturing a product. The method includes analyzing operational states of a plurality of tools included in a production line for producing products, respectively, each of the operational states being assumed based on production information of the products; extracting an operational period and a standby period of each of the tools, based on a result of the state analysis; calculating changes in a quantity of utilities consumed by each of the tools with respect to time, based on quantities of utilities consumed by each tool in operation and in standby during the operational periods and the standby periods; designing at least any of a utility facility for supplying utilities to each of the tools and a utility facility for disposing of utilities discharged from each of the tools, based on the changes in the quantity of utilities consumed by the tools; and manufacturing the products by use of the production line including the utility facility.

Still another aspect of the present invention inheres in a computer program product to be executed by a computer for designing a utility facility. The computer program product includes instructions configured to analyze operational states of a plurality of tools included in a production line for producing products, respectively, each of the operational states being assumed based on production information of the products; instructions configured to extract an operational period and a standby period of each of the tools, based on a result of the state analysis; instructions configured to calculate changes in a quantity of utilities consumed by each of the tools with respect to time, based on quantities of utilities consumed by each of the tools in operation and in standby during the operational periods and the standby periods; and instructions configured to design at least any of a utility facility for supplying utilities to each of the tools and a utility facility for disposing of utilities discharged from each of the tools, based on the changes in the quantity of utilities consumed by the tools.

BRIEF DESCRIPTION OF THE DRAWINGS

FIG. 2 is a table showing an exemplary product mix used in a method for designing the utility facility, according to the first embodiment of the present invention;

FIG. 3 is a table showing process information used in the method for designing the utility facility, according to the first embodiment of the present invention;

FIG. 4 is a table showing tool information used in the method for designing the utility facility, according to the first embodiment of the present invention;

FIG. 5 is a table showing tool operational state information used in the method for designing the utility facility, according to the first embodiment of the present invention;

FIGS. 13A to 13B are tables showing exemplary product mix used in a method for designing the utility facility, according to the modification of the first embodiment of the present invention;

FIGS. 14A to 14B are tables showing process information used in the method for designing the utility facility, according to the modification of the first embodiment of the present invention;

FIG. 15 is a table showing tool information used in the method for designing the utility facility, according to the modification of the first embodiment of the present invention;

FIG. 16 is a table showing tool operational state information used in the method for designing the utility facility, according to the modification of the first embodiment of the present invention;

FIG. 17 is a table showing exemplary product mix used in the method for designing the utility facility, according to the modification of the first embodiment of the present invention;

FIG. 18 is a table showing process information used in the method for designing the utility facility, according to the modification of the first embodiment of the present invention;

DETAILED DESCRIPTION OF THE INVENTION

Figure 1:
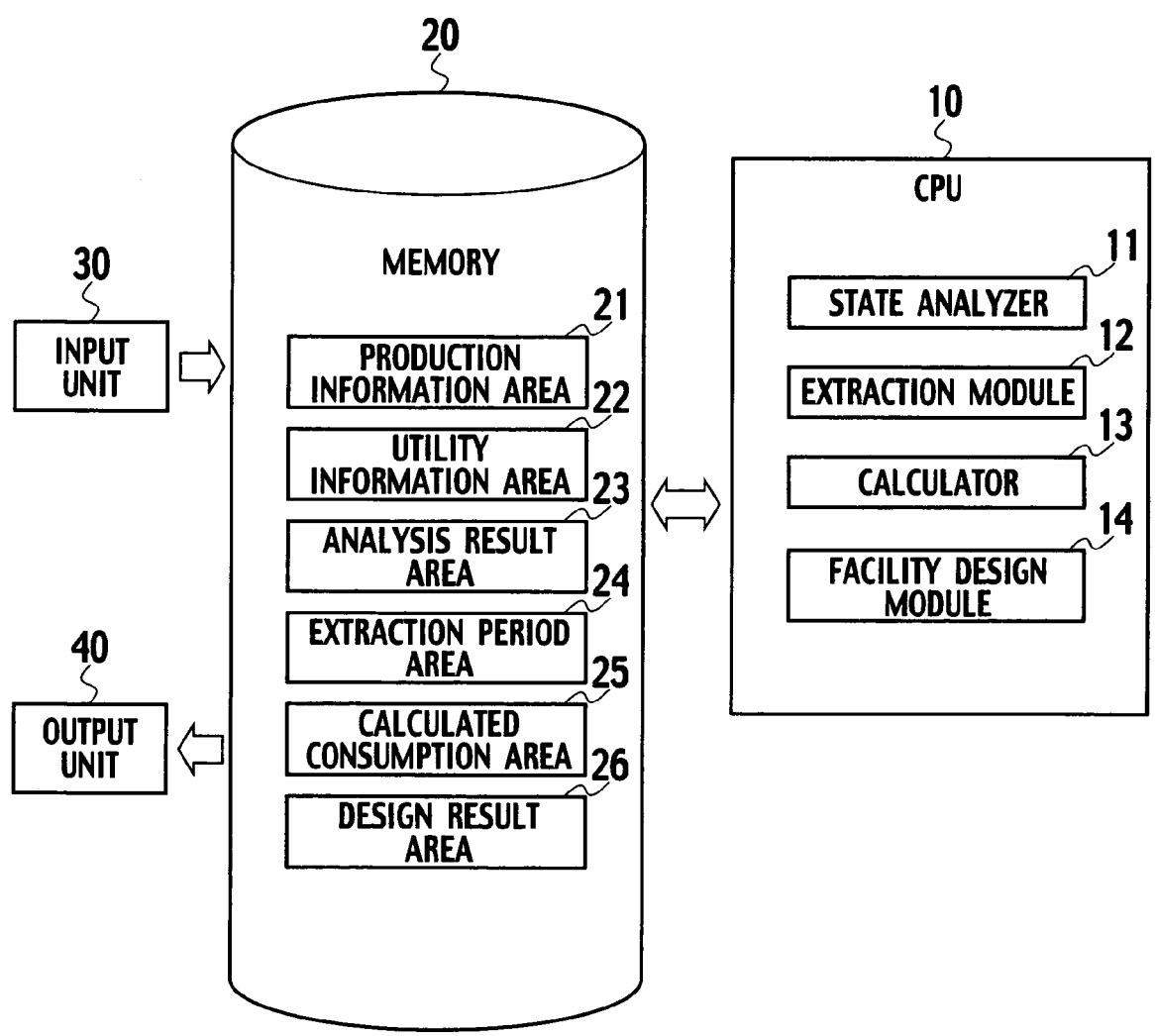
FIG. 1 is a schematic view showing a structure of a system for designing a utility facility, according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set forth such as specific signal values, etc., to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

First Embodiment

A system for designing a utility facility according to a first embodiment of the present invention includes a state analyzer 11, an extraction module 12, a calculator 13 and a facility design module 14, as shown in FIG. 1. The state analyzer 11 analyzes operational states of a plurality of tools included in a production line for producing products, respectively. Each of the operational states is assumed based on production information of the products. The extraction module 12 extracts an operational period and a standby period of each of the tools on the basis of the result of the state analysis of the tools. Based on the operational periods and the standby periods, the calculator 13 calculates changes in a quantity of utilities consumed by each of the tools with respect to time, based on quantities of utilities consumed by each of the tools in operation and in standby. Based on changes in the quantity of utilities consumed by all of the tools with respect to time, the facility design module 14 designs at least any of a utility facility for supplying utilities to each of the tools and a utility facility for disposing of utilities discharged from each of the tools. As shown in FIG. 1, the state analyzer 11, the extraction module 12, the calculator 13 and the facility design module 14 are included in a central processing unit (CPU) 10.

The "production information" includes a product mix which is a production plan for products, process information applied to the manufacturing of the products, information of types and numbers of tools included in the production line, tool operational state information, and the like. The "tool operational state information" includes information on maintenance frequency, time required for the maintenance, mean time between failures (MTBF), mean time to repair (MTTR) and the like with regard to each of the tools. The process information and the tool operational state information are acquired, for example, from information of an existing production line and the like. The "operational period" and the "standby period" are periods in which each of the tools included in the production line is respectively in operation and in standby.

FIG. 2 shows an example of a product mix. FIG. 2 shows a plan by which x wafers for a product A, y wafers for a product B and z wafers for a product C are intended to be produced each month.

FIG. 3 shows an example of the process information. FIG. 3 shows that a tool M1 is used in a process step SA1 for $a_1$ minutes, and a tool M2 is used in a process step SA2 for $a_2$ minutes, for the purpose of producing the product A. In a case for semiconductor products, the process steps SA1 and SA2 are, for example, an etching process, a diffusion region forming process, an interconnect forming process and the like. In addition, tools M1 and M2 are, for example, a reactive ion etching (RIE) system, an ion implanter, a sputtering system and the like. As shown in FIG. 3, the tool M1 is used in the process step SB1 for $b_1$ minutes, and the tool M3 is used in the process step SB2 for $b_2$ minutes, for the purpose of producing the product B. The tool M2 is used in the process step SC1 for $c_1$ minutes, and the tool M3 is used in the process step SC2 for $c_2$ minutes, for the purpose of producing the product C.

FIG. 4 shows an example of the tool information of the tools included in the production line. The production line includes i tools M1, j tools M2 and k tools M3 (i, j and k are natural numbers).

FIG. 5 shows an example of the tool operational state information. The tool M1 is placed under maintenance service every day, and the time required for the maintenance service is 90 minutes. The MTBF of the tool M1 is 700 hours, and the MTTR of the tool M1 is 150 minutes. The tool M2 is placed under maintenance service for each 50 lots, and the time required for the maintenance service is 180 minutes. The MTBF of the tool M2 is 1200 hours, and the MTTR of the tool M2 is 240 minutes. The tool M3 is placed under maintenance service every 7 days, and the time required for the maintenance is 90 minutes. The MTBF of the tool M3 is 900 hours, and the MTTR of the tool M1 is 120 minutes.

The "utilities" are required for manufacturing products in the production line. Examples of the utilities include electricity, pure water, cooling water, a refrigerant for a chiller, solid materials for ion doping, high-pressure air, clean air, dried air, nitrogen ($N_2$) gas, oxygen ($O_2$) gas, hydrogen ($H_2$) gas, helium (He) gas, argon (Ar) gas, other semiconductor material gases, semiconductor material gases liquefied at room temperature, chemical solutions, resists for lithography, materials for applied insulating films, and slurries for chemical mechanical polishing (CMP). Examples of the "semiconductor material gases liquefied at room temperature" include tetraethoxysilane (TEOS), triethoxyarsine (TEOA) and triethyl borate (TEB). Hereinafter, information of quantities of utilities, which are consumed while the tools included in the production line are in operation and in standby, is referred to as "utility information."

A utility facility includes plants respectively for manufacturing, for supplying, and for disposal treatments and the like on utilities consumed by each of a plurality of tools included in the production line, as well as central supply facilities and disposal treatment facilities. The disposal treatments include exhaust air treatment and wastewater treatment. Examples of the wastewater treatment include neutralization treatments, removal of poisonous metals contained in the wastewater, and treatments and the like for reducing biochemical oxygen demand (BOD) and chemical oxygen demand (COD) of the wastewater. In other words, the utility facility includes the exhaust air facilities and the wastewater facilities. In addition, the utility facility also performs evacuation treatment on each of the tools. The utility facility includes piping for supplying utilities to each of the tools and piping for exhaustion from each of the tools (hereinafter referred to simply as the "piping") as well as wiring.

FIGS. 6A to 6D show examples of the utility information. The abscissas axis of each of FIGS. 6A to 6D indicates a lapse of time for which a process is carried out by use of a tool using $N_2$ gas. The ordinates axis of each of FIGS. 6A to 6D indicates a quantity of $N_2$ gas consumed by the tool per unit time.

Figure 6A:
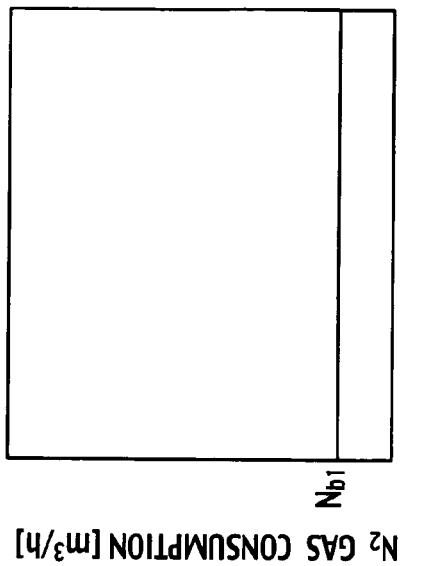
FIGS. 6A to 6D are graphs showing utility information used in the method for designing the utility facility, according to the first embodiment of the present invention.
Figure 6B:
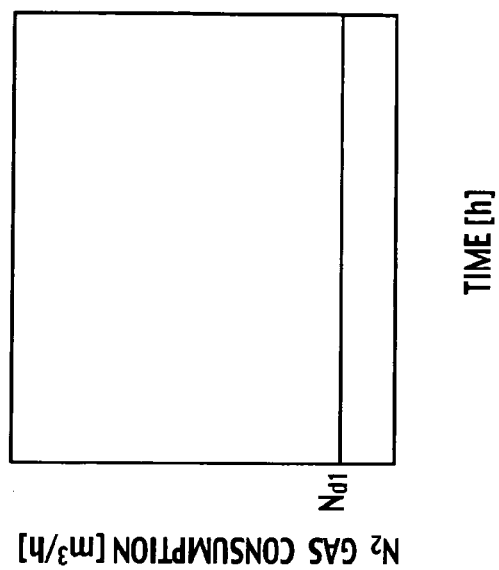

FIG. 6A shows examples of quantities of $N_2$ gas consumed by the tool M1 in operation in the process step SA1. The process step SA1 is started at time $t_{a1}$, and the quantities of $N_2$ gas consumed by the tool M1 are a quantity $N_{a1}$ from time $t_{a1}$ to $t_{a2}$, a quantity $N_{a2}$ from time $t_{a2}$ to $t_{a3}$, a quantity $N_{a1}$ from time $t_{a3}$ to $t_{a4}$, and zero on and after time $t_{a4}$. FIG. 6B shows an example of a quantity of $N_2$ gas consumed by the tool M1 in standby in the process step SA1. The quantity of $N_2$ gas consumed by the tool M1 in standby is a quantity $N_{b1}$ of $N_2$ gas, which is constant.

Figure 6C:
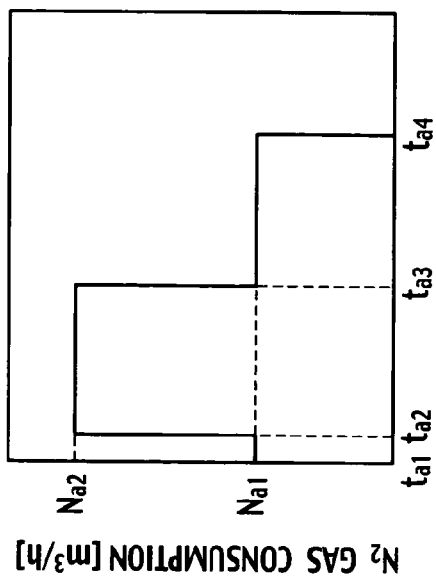
Figure 6D:
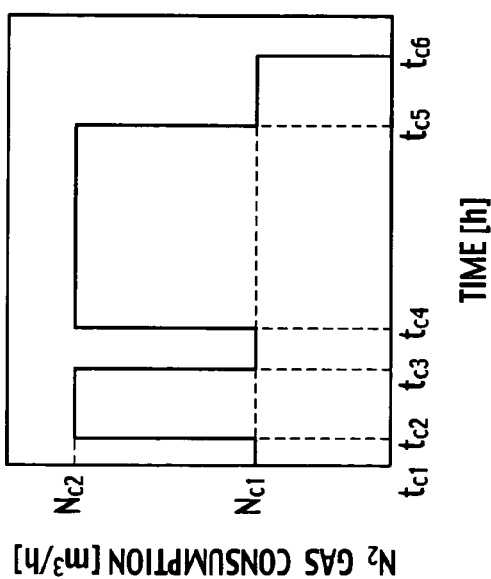

FIG. 6C shows examples of quantities of $N_2$ gas consumed by the tool M2 in operation in the process step SA2. The quantities of $N_2$ gas consumed by the tool M2 in operation are a quantity $N_{c1}$ of $N_2$ gas consumed from time $t_{c1}$, when the process step SA2 is started, through time $t_{c2}$, a quantity $N_{c2}$ of $N_2$ gas consumed from time $t_{c2}$ through time $t_{c3}$, a quantity $N_{c1}$ of $N_2$ gas consumed from time $t_{c3}$ through time $t_{c4}$, a quantity $N_{c2}$ of $N_2$ gas consumed from time $t_{c4}$ through time $t_{c5}$, and a quantity $N_{c1}$ of $N_2$ gas consumed from time $t_{c5}$ through time $t_{c6}$. On and after time $t_{c6}$, a quantity of $N_2$ consumed by the tool M2 is equal to zero. FIG. 6D shows an example of a quantity of $N_2$ gas consumed by the tool M2 in standby in the process step SA2. The quantity of $N_2$ gas consumed by the tool M1 in standby is a constant quantity $N_{d1}$. Every tool can have more than one piece of utility information, which varies by products to products, or processes to processes.

As shown in FIG. 1, a system for designing a utility facility according to the first embodiment of the present invention further includes a memory 20, an input unit 30 and an output unit 40. The memory 20 includes a production information area 21, a utility information area 22, an analysis result area 23, an extraction period area 24, a calculated consumption area 25 and a design result area 26.

The production information is stored in the production information area 21. The utility information of each of the tools included in the production line is stored in the utility information area 22. Information of an operational state of each of the tools, as analyzing by the state analyzer 11, is stored in the analysis result area 23. Information of an operational period and a standby period of each of the tools, as extracted by the extraction module 12, is stored in the extraction period area 24. Information of changes in quantities of utilities consumed by each of the tools with respect to time, as calculated by the calculator 13, is stored in the calculated consumption area 25. A design result of the utility facility is stored in the design result area 26.

The input unit 30 includes a keyboard, a mouse pointer, a light pen, and a flexible disk unit or other equivalent elements. A person responsible for designing the utility facility uses the input unit 30 to designate input/output data. Moreover, setting an output data format via the input unit 30 is possible, and inputting an instruction for executing or stopping the design is also possible.

The output unit 40 includes a display and a printer, which display recipe contents, or a recording unit, which stores information in a computer readable recording medium. A 'computer readable recording medium' refers to a medium such as an external storage unit for a computer, a semiconductor memory, a magnetic disk, or an optical disk, which may store electronic data. More specifically, a 'computer readable recording medium' may be a flexible disk, a compact disk read only memory (CD-ROM), or a magneto-optics (MO) disk.

Descriptions will be provided below for an example of a method for designing a utility facility by use of the system for designing a utility facility, shown in FIG. 1, with reference to a flowchart shown in FIG. 7.

In step S11, for example, the product mix shown in FIG. 2, the process information shown in FIG. 3, the tool information shown in FIG. 4 and production information of products, including the tool operational state information shown in FIG. 5, are stored in the production information area 21 through the input unit 30. The utility information of each of the tools included in the production line is stored in the utility information area 22.

In step S12, the state analyzer 11 reads the production information of products from the production information area 21. Based on the production information, the state analyzer 11 analyzes states of the plurality of tools, for which utilities are to be designed, in the production line. For example, the state analyzer 11 can refer to the tool information of each of the tools included in a real production line for actually manufacturing products. Thereby, the state analyzer 11 constructs, in memory reserved in the memory 20, a virtual production line including substantially the same functions as the real production line includes. The state analyzer 11 simulates the real production line by use of the virtual production line, and thereby analyzes respective operational states of the plurality of tools included in the real production line. Specifically, step orders of processing products, time required for each of the processing steps, the types and the numbers of tools included in the production line, maintenance information, and the like are taken into consideration. Thus, the production line is simulated virtually, and subsequently, an operation time of each of the tools is determined. Based on the determined operation time of each of the tools, the state analyzer 11 analyzes the operational state of each of the tools. The result of the analysis is stored in the analysis result area 23.

Figure 8:
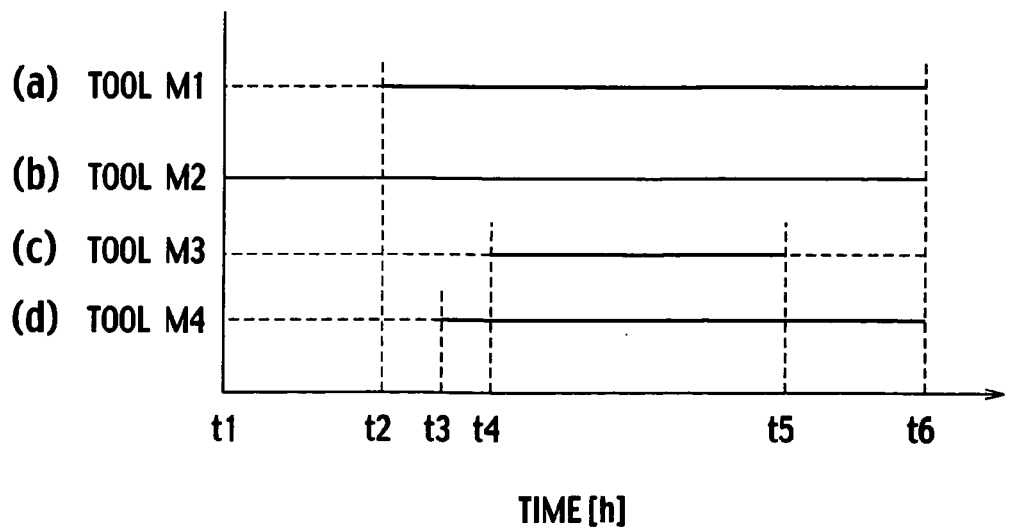
FIG. 8 is a graph showing an operational period and a standby period of the tools extracted by the system for designing the utility facility, according to the first embodiment of the present invention.

In step S13, the extraction module 12 reads the result of the analysis from the analysis result area 23. From the result of the analysis, the extraction module 12 extracts the operational period and the standby period of each of the tools included in the production line. FIG. 8 shows an example of the result of the analysis. The abscissa axes in FIG. 8 indicate time, and shows the operational period and the standby period of each of the tools M1 to M4 included in the production line. Continuous lines respectively show periods in which the tools M1 to M4 are in operation. Dashed lines respectively show periods in which the tools M1 to M4 are in standby. As shown in FIG. 8, the operational period of the tool M1 is a time period from time t2 to time t6, and the standby period thereof is a time period from time t1 to time t2. The operational period of the tool M2 is a time period from time t1 to time t6. The operational period of the tool M3 is a time period from time t4 to time t5, and the standby periods thereof are a time period from time t1 to time t4, and a time period from time t5 to time t6. The operational period of the tool M4 is a time period from time t3 to time t6, and the standby period thereof is a time period from time t1 to time t3. The information of the operational periods and the standby periods, which have been thus extracted, is stored in the extraction period area 24.

Figure 9:
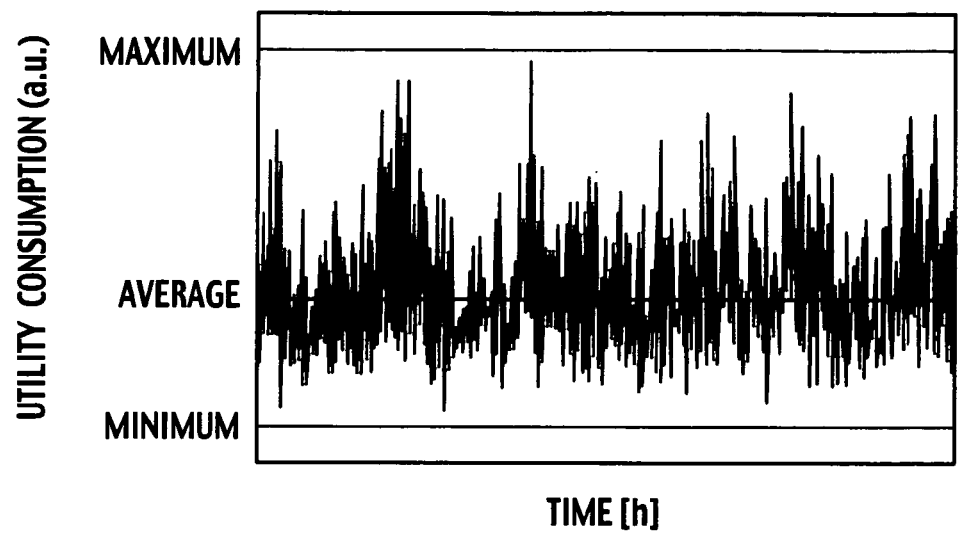
FIG. 9 is a graph showing quantities of utilities consumption calculated by the system for designing the utility facility, according to the first embodiment of the present invention.

In step S14, the calculator 13 reads the information of the operational periods and the standby periods from the extraction period area 24. The calculator 13 reads the utility information of each of the tools included in the production line from the utility information area 22. Based on the information of the operational periods and the standby periods and on quantities of utilities consumed by each of the tools in operation and in standby, which tools are included in the production line, the calculator 13 calculates changes with respect to time in quantities of utilities consumed by each of the tools during production of products. The calculated quantities of utilities consumed by each of the tools are summed, and thereby changes in quantity of utilities consumed by the whole production line are calculated with respect to time. FIG. 9 shows examples of the changes in quantities of utilities consumed with respect to time. FIG. 9 shows an average, maximum and minimum values of a quantity of $N_2$ gas consumed in the production line from the tenth month through the twelfth month in a case where a time period of the analysis is set at twelve months. The information of calculated changes in quantities of utilities consumed with respect to time is stored in the calculated consumption area 25. The calculated changes in quantities of utilities consumed with respect to time can be displayed, as an image, in the output unit 40 shown in FIG. 1, or can be processed in a similar manner.

In step S15, the facility design module 14 reads the information of the changes in quantities of utilities consumed with respect to time from the calculated consumption area 25. Based on the information of the changes in quantities of utilities consumed with respect to time, the facility design module 14 designs a configuration of the utility facility. In other words, the facility design module 14 determines the size of the utility facility for supplying utilities to each of the tools included in the production line, so as to ensure quantities of utilities to be supplied, which are demanded for production of products. For example, the facility design module 14 determines the capacity, the number, and the like of, a $N_2$ plant for supplying $N_2$ gas, depending on a total quantity of $N_2$ gas demanded by each of the tools included in the production line. In this design stage, the maximum, average and minimum values of each of the quantities of utilities consumed are used respectively in designing each component of the utility facility. For example, based on the average value of the quantity of $N_2$ gas consumed, which is shown in FIG. 9, the facility design module 14 designs a $N_2$ gas generator. Additionally, based on the maximum value of the quantity of $N_2$ gas consumed, which is shown in FIG. 9, the facility design module 14 designs an evaporator for evaporating liquid $N_2$ and a proper piping bore. The result of the design is stored in the design result area 26. The design result which has been stored in the design result area 26 can be transmitted externally of the system for designing a utility facility through the output unit 40. Based on the design result, the utility facility for supplying the utilities to the production line is installed in the production line.

With regard to step S12, the example where the state analyzer 11 constructs the virtual production line in order to analyze the operational states, respectively, of the tools included in the production line has been described. However, the following process flow may be adopted. The constructed virtual production line is stored beforehand in the memory 20. The state analyzer 11 reads the stored virtual production line, and thus analyzes the operational states, respectively, of the tools.

With regard to step S14, the example where the calculator 13 calculates the average value, the maximum value and the minimum value of each of the quantities of utilities consumed, which vary with respect to time, has been described. Changes in terms of quantities of utility actually consumed can be more accurately calculated with respect to time by calculating the mode, the median, the variance, and the standard deviation value of each of the quantities of utilities consumed. For example, the modes or the medians can be used instead of the average values. Additionally, values obtained by adding the modes or the medians, respectively, to values obtained by standard deviation multiplied with a number may be used instead of the corresponding maximum values. In this respect, it is desirable that the "a number" should be a real number of three to five.

In the foregoing descriptions, in step S15, the facility design module 14 determines the size of the utility facility for supplying the utilities to each of the tools included in the production line. However, a designer of the utility facility may determine the size of the utility facility on the basis of the changes in quantities of utilities consumed with respect to time, which has been acquired in step S14.

Figure 10:
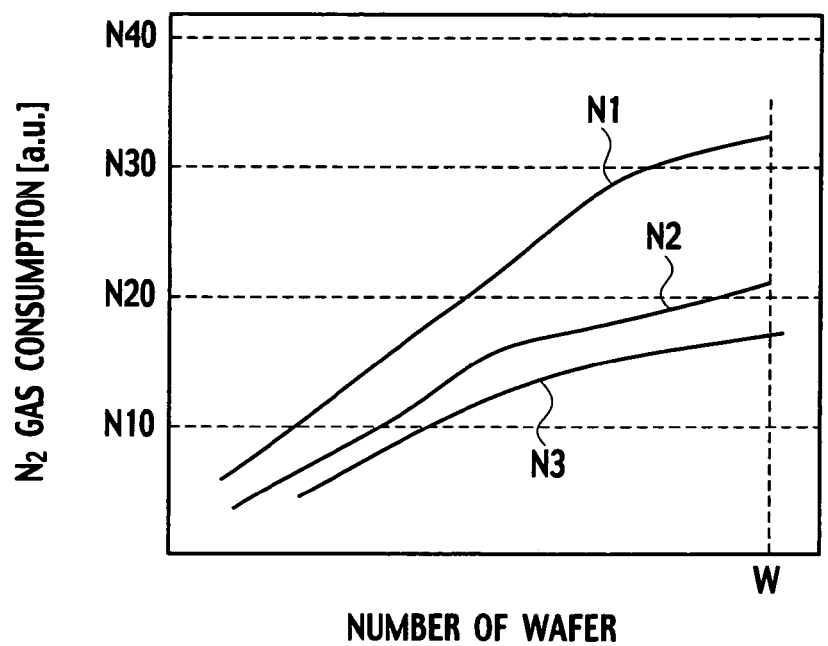
FIG. 10 is a graph showing quantities of utilities consumptions calculated by related art and the system for designing the utility facility, according to the first embodiment of the present invention.

FIG. 10 shows a few examples of the designing of a utility facility including a $N_2$ plant for supplying $N_2$ gas to a growing production line for semiconductor devices. One is a quantity N1 of $N_2$ gas which is calculated by use of the related art, and the other is a quantity N2 of $N_2$ gas which is calculated by use of the system for designing a utility facility shown in FIG. 1. The quantity N1 of $N_2$ gas is calculated based on quantities of utilities consumed by each tool, which are calculated by use of utility specifications of the tools. The abscissa axes in FIG. 10 indicate the numbers of wafers to be processed in the production line. The ordinate axes therein indicate a quantity of $N_2$ gas estimated for the production line. The quantity of $N_2$ gas is specified in cubic meters per hour ($m^3/h$), for example. As shown in FIG. 10, a quantity N10 of $N_2$ gas can be supplied by one $N_2$ plant. Two $N_2$ plants are needed when the quantity of $N_2$ gas is in a range of quantities N10 to N20. Three $N_2$ plants are needed when the quantity of $N_2$ gas is in a range of quantities N20 to N30. Four $N_2$ plants are needed when the quantity of $N_2$ gas is in a range of quantities N30 to N40. In this case, for example, for the purpose of processing w wafers, the utility facility designed by use of the related art demands four $N_2$ plants, whereas the utility facility designed by the system for designing a utility facility shown in FIG. 1 indicates three $N_2$ plants are enough. Consequently, the design of the utility facility by the system shown in FIG. 1 makes it possible to avoid designing a utility facility which has an excessive quantity of $N_2$ gas, and to accordingly design an efficient utility facility.

The quantity N3 of $N_2$ gas, shown in FIG. 10, is an example of the quantities of $N_2$ gas which is calculated by the system for designing a utility facility shown in FIG. 1 in a case where measures are taken to reduce a quantity of $N_2$ gas consumed in the production line. Examples of the measures to reduce the quantity of $N_2$ gas consumed in the production line include enhancing efficiency of consumption of $N_2$ gas by each of the tools included in the production line. As shown in FIG. 10, the reduction of the quantities of $N_2$ gas consumed in the production line from N2 to N3 makes it possible to estimate the number of $N_2$ plants included in the utility facility from three to two in the case where the number of wafers to be processed is w. In other words, the system for designing a utility facility shown in FIG. 1 makes it possible to evaluate effects beforehand of the measures to reduce the quantities of $N_2$ gas.

The foregoing illustrative descriptions have been provided for the example where the utility facility supplies $N_2$ gas to be consumed in the production line for semiconductor devices. The method for designing a utility facility described above can be also applied to the designing of a utility facility for supplying, or for performing disposal treatments on any of semiconductor material gas such as $O_2$ and $H_2$ other than $N_2$ gas, pure water, cooling water and the like. In a case where, for example, a utility facility for supplying electric power is intended to be designed, a transformer capacity is designed based on the calculated average value of a quantity of power consumed, and the trunk line or the size of wiring, is designed based on the calculated maximum value of the quantity of power consumed. When a utility facility for supplying pure water and wastewater treatment is intended to be designed, a primary pure water facility is designed based on the calculated average value of a quantity of pure water consumed, and an ultra pure water facility and sizes of piping bores are designed based on the calculated maximum value of the quantity of pure water consumed.

Figure 11:
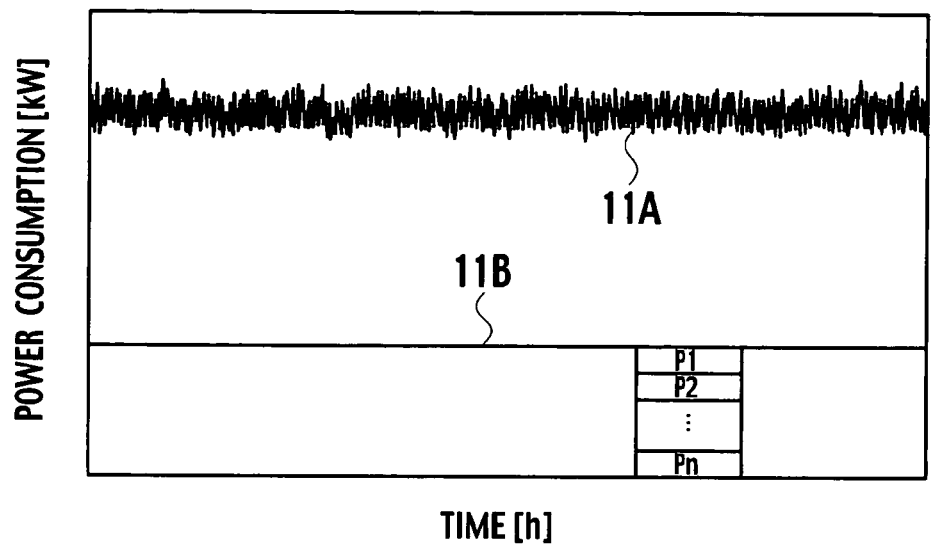
FIG. 11 is a graph showing a change in quantity of power consumption calculated by the system for designing the utility facility, according to the first embodiment of the present invention.

There is a risk that reduction of a quantity of utility supplied to a tool in operation may affect the performance of the tool. For this reason, it is desirable to preferentially investigate measures in standby to reduce a quantity of utility to be supplied to each tool in standby. The system for designing a utility facility, shown in FIG. 1, calculates quantities of utilities to be consumed by tools in operation and quantities of utilities to be consumed by tools in standby. In other words, the system for designing a utility facility, shown in FIG. 1, makes it possible to evaluate effects of the measures to reduce quantities consumed in standby, which are less likely to affect the performances of the tools. FIG. 11 shows an example of changes in the quantity of power consumed in the production line with respect to time. The power consumption change is calculated by the system for designing a utility facility shown in FIG. 1. In FIG. 11, power consumption 11A indicates a quantity of power consumed when the production line is in operation, and power consumption 11B indicates a quantity of power consumed when the production line is in standby. As shown in FIG. 11, the power consumption 11B of power consumed in standby is equivalent to approximately 30% of the power consumption 11A of power consumed in operation. Reduction of the power consumption 11B of power consumed in standby makes it possible to enhance the effects of the measures to reduce the quantity of power consumed as a whole.

The system for designing a utility facility shown in FIG. 1 calculates quantities of utilities consumed by each of the tools included in the production line, and calculates quantities of utilities consumed in each of the processing sequences in the production line. Powers P1 to Pn, shown in FIG. 11, represent the quantity of power consumed respectively in each process in standby at time tp (where n is an integer of 2 or more). For example, the processing steps SP1 to SPn include a diffusing step, a low-pressure chemical vapor deposition (LPCVD) step, a plasma chemical vapor deposition (PCVD) step and the like in a case where products are semiconductor devices.

Determining the quantity of utilities consumed by each of the tools or in each of the processing makes it possible for a process engineer to determine which tool or process consumes large quantity of utilities. As a result, it is possible to efficiently reduce quantities of utilities supplied to the production line.

Figure 12:
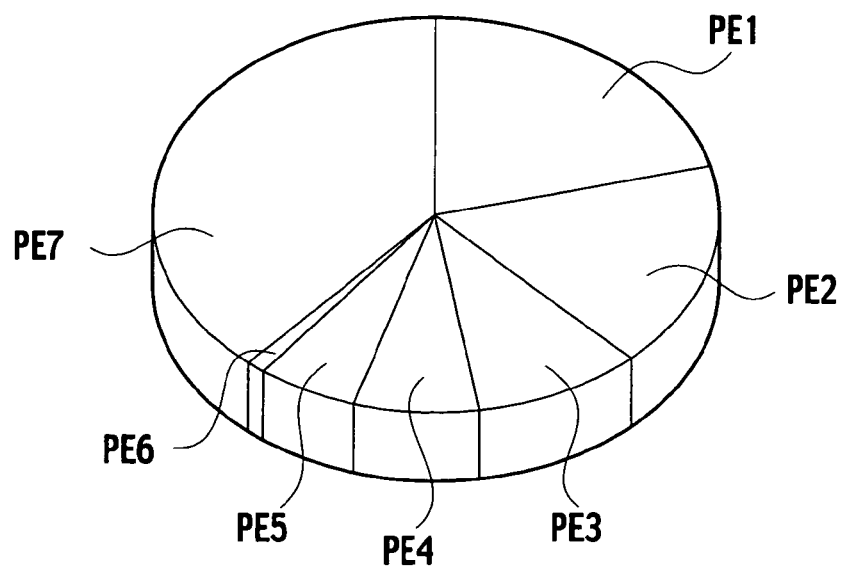
FIG. 12 is a graph showing quantity of power consumption of tool components calculated by the system for designing the utility facility, according to the first embodiment of the present invention.

The calculator 13 is capable of calculating quantities of utilities per each of a plurality of tool components included in the production line. Therefore, the quantity of utilities consumed can be calculated respectively by tool components included in the tools in common. The "tool components" are pumps, chillers and the like respectively commonly included in the tools. FIG. 12 shows quantities of power PE1 to PE6 consumed by respective tool components El to E6, and the quantities of power PE7 consumed by remaining tool components. In the case of the example shown in FIG. 12, the quantities of power PE1 consumed respectively by the tool component E1 total and the quantity of power PE2 consumed respectively by the tool component E2 total are larger than the other tool components. Thus, a combination of the totals PE1 and PE2 consume approximately one-third of the grand total. As a result, the process engineers may decide on a guideline that it is effective to chiefly investigate measures to reduce the quantities of power consumed by the tool component E1 and the tool component E2.

The system for designing a utility facility according to the first embodiment of the present invention calculates the average value and the like of each of the changes with respect to time of the quantity of utilities consumed in the production line, based on the operational periods, the standby periods, and the utility information of each of the tool, all of which have been extracted from the production information. The designing of the utility facility on the basis of the changes in the quantity of utilities consumed with respect to time can improve design accuracy values. As a result, the system for designing a utility facility, shown in FIG. 1, can avoid designing a utility facility in which excessive quantities of utilities are supplied, and accordingly design an efficient utility facility which is capable of supplying, and disposing of, utilities. In addition, the system for designing a utility facility, shown in FIG. 1, calculates the quantity of utilities consumed by each of the tools or in each of the process steps. Accordingly, this makes it easy to estimate how much effect will be brought about by measures to cut back the quantity of utilities in each of the tools or in each of the process steps.

The system for designing a utility facility shown in FIG. 1 makes it possible to avoid supplying excessive utilities by the utility facility, and to reduce the quantity of utilities to be supplied to the production line. As a result, by manufacturing the products by use of the production line including the designed utility facility, costs of manufacturing the products can be reduced. In a case a utility facility for supplying utilities to the production line for semiconductor devices is designed by the system shown in FIG. 1, the costs of manufacturing semiconductor devices are reduced by use of the production line including tools such as the RIE system, the ion implanter and the sputtering system.

Figure 7:
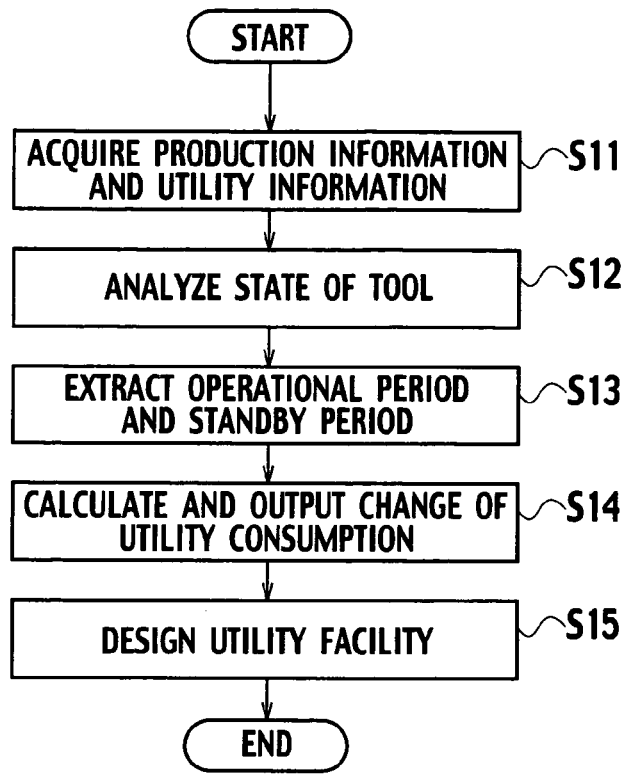
FIG. 7 is a flowchart explaining the method for designing the utility facility, according to the first embodiment of the present invention.

A series of operations for utility facility design shown in FIG. 7 may be carried out by controlling the system, shown in FIG. 1, by use of a program algorithm equivalent to that shown in FIG. 7. The program should be stored in the memory 20 of the system shown in FIG. 1. In addition, a series of operations for designing a utility facility of the present invention may be carried out by storing such a program in a computer-readable recording medium and instructing the memory 20, shown in FIG. 1, to read the recording medium.

[Modification]

The foregoing descriptions have been provided for the case where a utility facility for a factory is newly designed. The method for designing a utility facility according to the first embodiment of the present invention can be applied to a case where a production plan of an existing factory is modified.

Descriptions will be provided below for an example of the design of a utility facility where a production plan with a product mix shown in FIG. 13B is intended to be added to an existing factory. The existing factory produces products based on a production plan with a product mix shown in FIG. 13A. FIG. 13A shows the product mix of products currently in production. FIG. 13B shows the product mix of additional products to be manufactured. In other words, the processing of $x_2$ wafers and $y_2$ wafers, respectively, for the products $A_2$ and $B_2$ is intended to be added to an existing manufacturing facility which processes $x_1$ wafers and $y_1$ wafers, respectively, for the products $A_1$ and $B_1$, monthly.

FIGS. 14A and 14B respectively show examples of process information of the products $A_1$, $B_1$, $A_2$ and $B_2$. FIG. 14A shows that, for the purpose of manufacturing the products $A_1$, the tool M10 is used in the process step SA11 for all minutes, and the tool M20 is used in the process step SA12 for $a_{12}$ minutes. In addition, for the purpose of manufacturing the products $B_1$, the tool M10 is used in the process step SB11 for $b_{11}$, minutes, and the tool M30 is used in the process step SB12 for $b_{12}$ minutes. FIG. 14B shows that, for the purpose of manufacturing the products $A_2$, the tool M10 is used in the process step SA21 for $a_{21}$ minutes, and the tool M20 is used in the process step SA22 for $a_{22}$ minutes. In addition, for the purpose of manufacturing the products $B_2$, the tool M10 is used in the process step SB21 for $b_{21}$ minutes, and the tool M30 is used in the process step SB22 for $b_{22}$ minutes. In this respect, the tools M10, M20 and M30 are tools included in the production line in the existing factory.

FIG. 15 shows an example of tool information of the tools M10, M20 and M30. The production line includes l tools M10, m tools M20 and n tools M30 (l, m and n: natural numbers). In addition, FIG. 16 shows an example of tool operational state information.

The process information shown in FIG. 14A, the tool operational state information shown in FIG. 16, and the like can be acquired from the past record of operation of the existing factory.

In step S11 in the flowchart shown in FIG. 7, the system for designing a utility facility, shown in FIG. 1a, receives the product mix shown in FIG. 17, as part of the production information. The product mix is obtained by combining the product mix shown in FIG. 13A with the product mix shown in FIG. 13B. The system for designing a utility facility receives process information shown in FIG. 18, as part of the production information. The system for designing a utility facility receives the tool information, shown in FIG. 15, and the tool operational state information with regard to the tools M10, M20 and M30, which is shown in FIG. 16, as another part of production information.

Subsequently, utility facility is designed by the method described in FIG. 7. As a result, the utility facility can be designed with little difference between quantities of utility actually consumed and supplied, and the facility is capable of supplying enough utilities for achieving the growing production plan with the product mix shown in FIG. 17.

Based on the utility facility thus designed, the additional change of the utility facility can be examined by considering the quantity of utilities supplied by the utility facility of the existing factory. For example, a new utility facility to be added to the existing utility facility is designed in order to fill the gap between the quantity of utilities supplied by the existing utility facility and the quantity of new utility demand.

In the method for designing a utility facility according to the modification of the first embodiment of the present invention, changes with respect to time, in total, of the quantity of utilities consumed for producing products of an existing type and products to be added are calculated. The utility facility is designed based on the calculated changes in quantities of utilities to be consumed. For this reason, in the case where a production plan is intended to be added in an existing factory, accuracy of each of the design can be improved. As a result, it is possible to avoid designing a utility facility in which excessive quantities of utilities are provided, and to design an efficient utility facility capable of supplying utilities.

Second Embodiment

Figure 19:
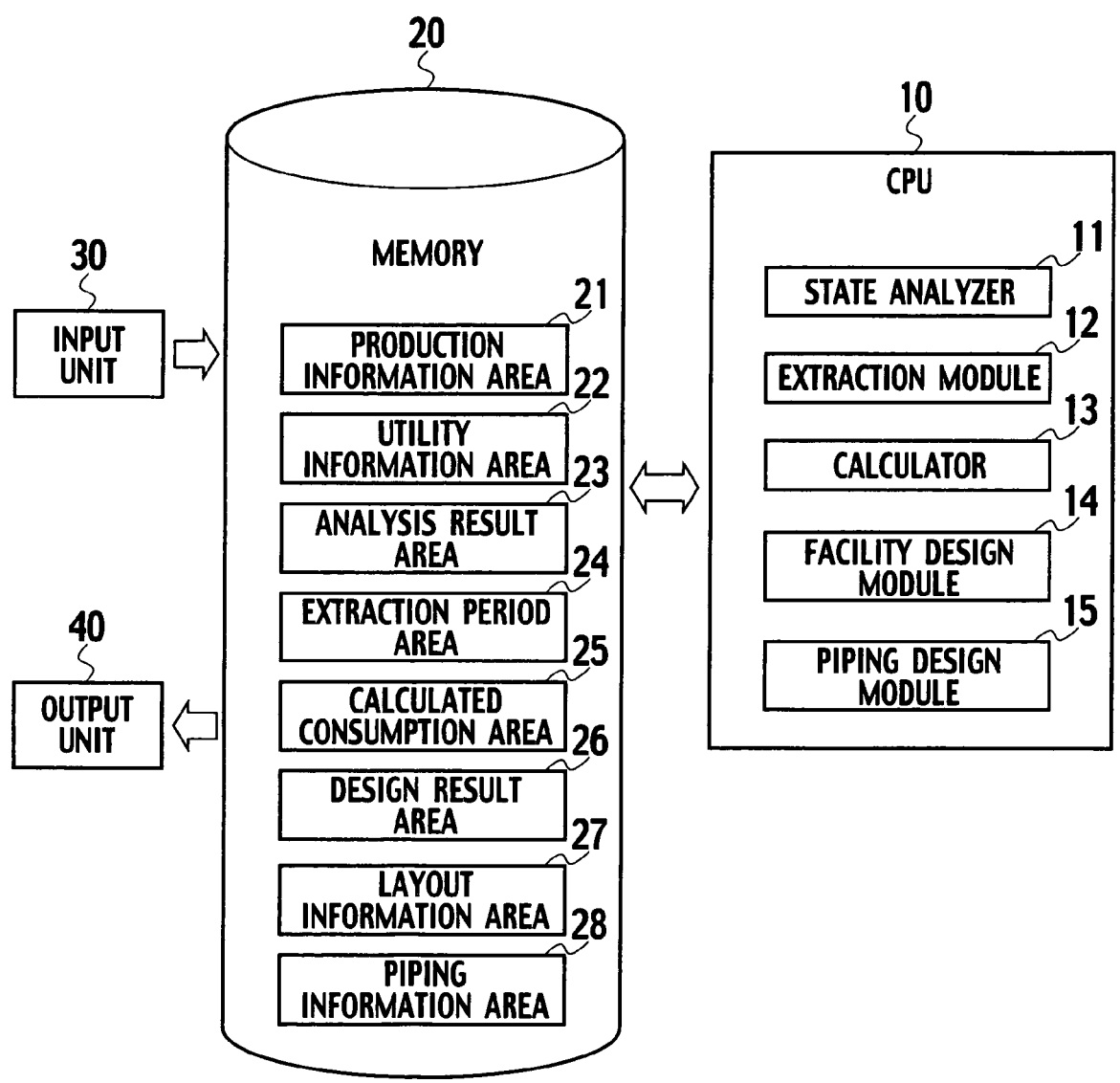
FIG. 19 is a schematic view showing a structure of a system for designing a utility facility, according to a second embodiment of the present invention.

A system for designing a utility facility according to a second embodiment of the present invention is different from the system for designing a utility facility shown in FIG. 1 in the point that, as shown in FIG. 19, the system according to the second embodiment further includes a piping design module 15, a layout information area 27 and a piping information area 28. The other configuration of the system for designing a utility facility according to the second embodiment is the same as the configuration of the system according to the first embodiment.

Layout information of the production line, to which the utility facility supplies utilities, is stored in the layout information area 27. The "layout information of the production line" is information for indicating where in a factory each of the tools included in the production line are to be installed.

The piping design module 15 designs piping through which the utility facility supplies utilities to each of the tools included in the production line. More specifically, the piping design module 15 determines piping bores, branch points of the piping and the like, based on quantities of utilities supplied to each of the tools and the layout information of the production line. A result of the designing of the piping by the piping design module 15 is stored in the piping information area 28.

Figure 20:
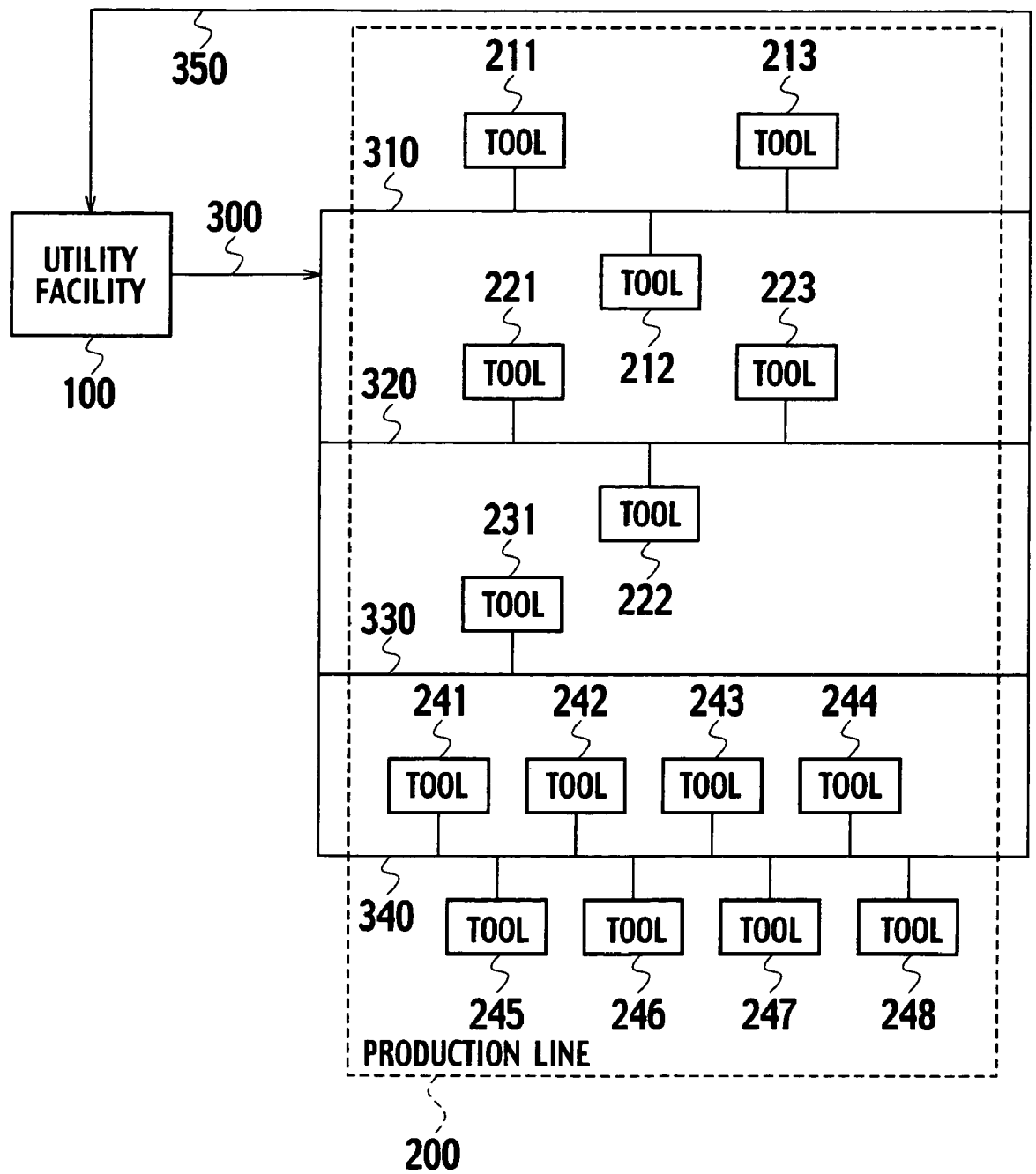
FIG. 20 is a schematic view explaining layout information used in the method for designing the utility facility, according to the second embodiment of the present invention.

Descriptions will be provided below for an example of a method for designing piping through which ultra pure water is supplied from a utility facility 100 to a production line 200 for semiconductor devices, as shown in FIG. 20. It is assumed that, in a manner similar to that which has been described with regard to the first embodiment, the utility facility 100 is designed by the system for designing a utility facility shown in FIG. 19, based on the quantity of ultra pure water consumed in the production line 200.

As shown in FIG. 20, the ultra pure water is supplied from the utility facility 100 to the production line 200 through a main pipe 300. The ultra pure water is returned from the production line 200 to the utility facility 100 through a main pipe 350. The piping design module 15 determines the bores, strengths and the like of each of the main pipes 300 and 350, based on the quantity of ultra pure water supplied from the utility facility 100.

In the case of the layout of the production line 200, a group of tools 211 to 213, a group of tools 221 to 223, a group of tool 231, and a group of tools 241 to 248 are installed, respectively, in areas in the factory. The piping design module 15 analyzes the layout information of the production line, and thus arranges sub-main pipes 310, 320, 330 and 340, respectively, in areas of the group of tools 211 to 213, the group of tools 221 to 223, the group of tool 231, and the group of tools 241 to 248. Ultra pure water is supplied to tools 211 to 213 through the sub-main pipe 310. Ultra pure water is supplied to tools 221 to 223 through the sub-main pipe 320. Ultra pure water is supplied to tool 231 through the sub-main pipe 330. Ultra pure water is supplied to tools 241 to 248 through the sub-main pipe 340. As shown in FIG. 20, the sub-main pipes 310, 320, 330 and 340 are branched out from the main pipe 300 connected to the utility facility 100. In addition, the sub-main pipes 310, 320, 330 and 340 are connected to the main pipe 350. The main pipe 350 is connected to the utility facility 100. In the case where the production line 200 is for semiconductor devices, the group of tools 211 to 213, the group of tools 221 to 223, the group of tool 231 and the group of tools 241 to 248 are a wet bench, a CMP system and the like.

The system for designing a utility facility, shown in FIG. 19, calculates the quantity of ultra pure water consumed respectively by the group of tools 211 to 213, the group of tools 221 to 223, the group of tool 231 and the group of tools 241 to 248. The piping design module 15 designs the bore, the strength and the like of the sub-main pipe 310, based on the quantity of ultra pure water to be supplied respectively to tools 211 to 213. The piping design module 15 similarly designs the bore, the strength and the like of each of the sub-main pipes, 320, 330 and 340, based on the quantity of ultra pure water supplied respectively to tools 221 to 223, tool 231, and tools 241 to 248.

Figure 21:
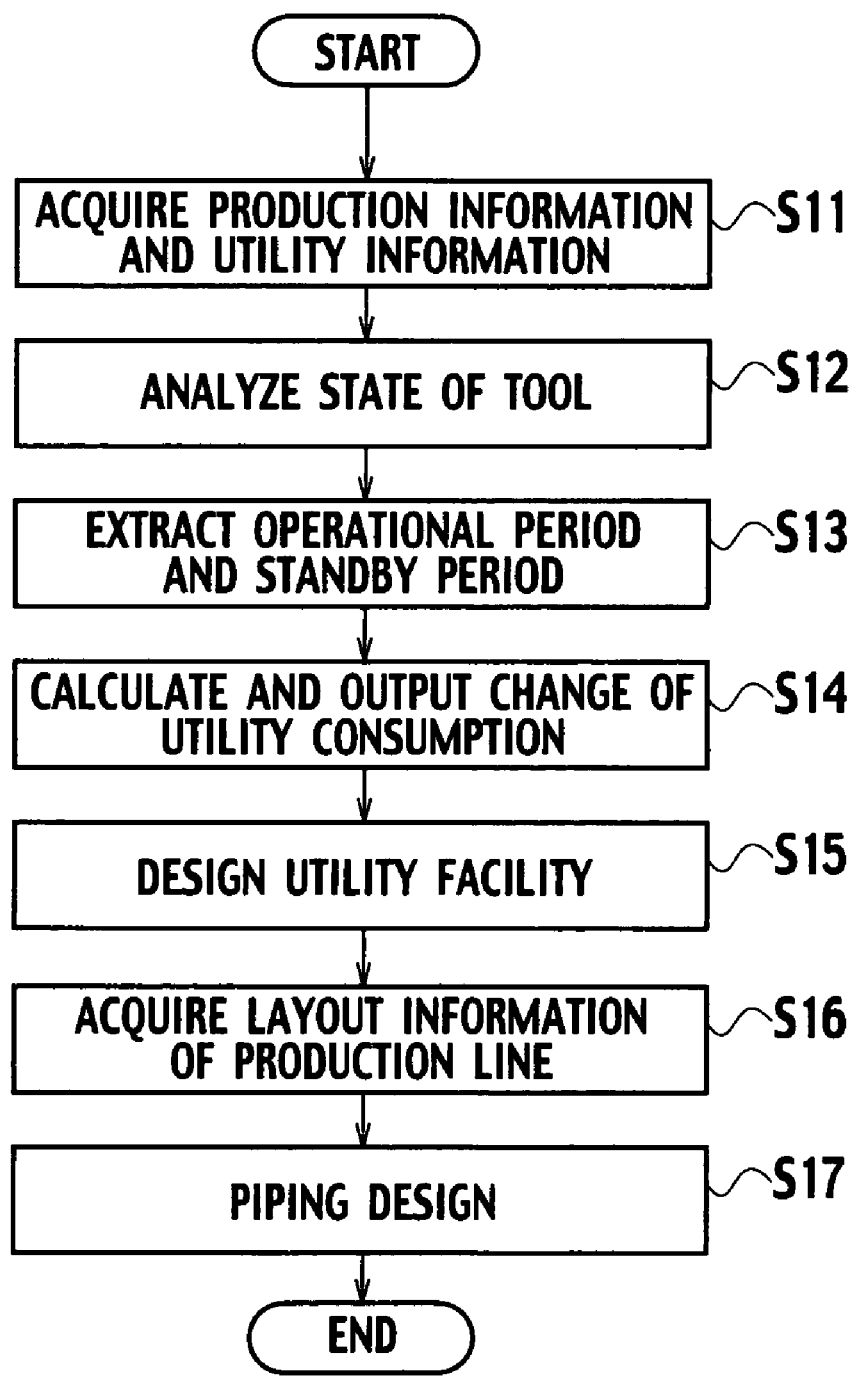
FIG. 21 is a flowchart explaining the method for designing the utility facility, according to the second embodiment of the present invention.

The foregoing descriptions have been provided for the method for designing the piping for ultra pure water. The foregoing method for designing piping can be applied to piping to supply each of $N_2$ gas, $O_2$ gas, $H_2$ gas and the like, air exhaust piping, drain piping and electrical wiring. Descriptions will be provided for a method for designing a utility facility by use of the system shown in FIG. 19 with reference to a flowchart shown in FIG. 21.

In steps S11 to S15, a configuration of the utility facility is designed based on changes in the quantity of utilities consumed with respect to time, in a manner similar to that which has been described with reference to the flowchart shown in FIG. 7. A result of the design is stored in the design result area 26.

In step S16, the layout information of the production line is stored in the layout information area 27 through the input unit 30, shown in FIG. 19. It does not matter that the layout information of the production line is stored beforehand in the layout information area 27.

In step S17, the piping designing module 15 reads the result of the utility facility design and the layout information of the production line, respectively, from the design result area 26 and the layout information area 27. The piping design module 15 analyzes the layout information of the production line. Based on the analyzed layout information of the production line and the quantity of utilities supplied to each of the tools included in the production line, the piping design module 15 designs the piping. The result of the piping design is stored in the piping information area 28.

The piping design result can be transmitted externally of the system for designing a utility facility through the output unit 40. Based on the result of the piping design, pipes are installed through which the utility facility supplies utilities to the production line. Other elements are substantially the same as elements of the first embodiment, and the descriptions will be omitted.

The system for designing a utility facility according to the second embodiment of the present invention can accurately design the piping for supplying utilities from the utility facility relative to the quantity of utilities consumed during actual operation to each of the tools included in the production line, depending on the quantity of utilities consumed by each of the tools. As a result, it is possible to avoid a piping design with excessive capacity for supplying utilities to each of the tools, and to avoid increased costs for installing the piping.

Other Embodiments

The foregoing descriptions of the first and second embodiments have been provided for an example where the system for designing a utility facility, shown in FIG. 1, analyzes states of the tools included in a production line, as described in steps S11 to S12 of the flowchart shown in FIG. 7. The system calculates changes in the quantity of utilities consumed with respect to time, as described in steps S13 to S14. It does not matter that the method for designing a utility facility, shown in the flowchart of FIG. 7, is carried out by use of a first simulator for analyzing the operational states of the respective tools included in the real production line, and a second simulator for calculating the changes in the quantity of utilities consumed with respect to time. In such case, it does not matter that, for example, a result of analysis of the first simulator is manually provided to the second simulator. It does not matter that the result of analysis of the first simulator is transferred to the second simulator online by electrically connecting the first and second simulators with each other.

In addition, the foregoing descriptions of the first and second embodiments have been provided for the example where the production line is for semiconductor products. One may consider that it is easily understood from the foregoing descriptions that the present invention can be applied to the design of a utility facility for supplying utilities to a production line for automobiles, a production line for chemicals, or a production line for building components.

Various modifications will become possible for those skilled in the art after receiving the teachings of the present disclosure without departing from the scope thereof.

What is claimed is:

1. A system for designing a utility facility, the system comprising:
    a central processing unit comprising:
        a state analyzer configured to analyze operational states of a plurality of tools included in a production line for producing products, respectively, each of the operational states being assumed based on production information of the products, the production information including a production plan for the products;
        an extraction module configured to extract an operational period and a standby period of each of the tools, based on a result of the state analysis;
        a calculator configured to calculate changes in a quantity of utilities consumed by each of the tools with respect to time, based on quantities of utilities consumed by each of the tools in operation and in standby during the operational periods and the standby periods; and
        a facility design module configured to design at least any of a utility facility for supplying utilities to each of the tools and a utility facility for disposing of utilities discharged from each of the tools, based on the changes in the quantity of utilities consumed by all of the tools; and
    a memory configured to store the production information of the products, the result of the state analysis, information of the operational periods and the standby periods, and information of the changes in the quantity of utilities consumed by the tools.

2. The system of claim 1, wherein the state analyzer analyzes the operational states of the respective tools by simulating a production line virtually.

3. The system of claim 1, wherein the calculator calculates at least one of an average value, a maximum value, a minimum value, a mode, a median, a variance, and a standard deviation value of a quantity of utilities consumed in the production line.

4. The system of claim 1, wherein the production information includes process information applied to manufacturing the products and information of the tools.

5. The system of claim 4, wherein the information of the tools includes information of maintenance frequency and time required for the maintenance with regard to each of the tools.

6. The system of claim 1, wherein the calculator calculates the quantity of utilities consumed by each of the tools for each of a plurality of tool components included in the tool.

7. The system of claim 1, further comprising a piping design module configured to design piping through which the utility facility supplies utilities to each of the tools, based on layout information of the production line.

8. The system of claim 7, wherein the piping design module determines bores of the piping and branch points of the piping.

9. A computer implemented method for designing a utility facility, the method comprising:
    analyzing operational states of a plurality of tools included in a production line for producing products, respectively, each of the operational states being assumed based on production information of the products, the production information including a production plan for the products;
    extracting an operational period and a standby period of each of the tools, based on a result of the state analysis;
    calculating changes in a quantity of utilities consumed by each of the tools with respect to time, based on quantities of utilities consumed by each of the tools in operation and in standby during the operational periods and the standby periods; and
    designing at least any of a utility facility for supplying utilities to each of the tools and a utility facility for disposing of utilities discharged from each of the tools, based on the changes in the quantity of utilities consumed by all of the tools.

10. The method of claim 9, wherein the operational states of the tools is analyzed respectively by simulating a production line virtually.

11. The method of claim 9, further comprising:
    calculating at least one of an average value, a maximum value, a minimum value, a mode, a median, a variance, and a standard deviation value of a quantity of utilities consumed in the production line.

12. The method of claim 9, wherein the production information includes process information applied to manufacturing the products and information of the tools.

13. The method of claim 12, wherein the information of the tools includes information of maintenance frequency and time required for the maintenance with regard to each of the tools.

14. The method of claim 9, further comprising:
    calculating the quantity of utilities consumed by each of the tools for each of a plurality of tool components included in the tool.

15. The method of claim 9, further comprising:
designing piping through which the utility facility supplies utilities to each of the tools, based on layout information of the production line.

16. The method of claim 15, wherein the designing comprises determining bores of the piping and branch points of the piping.

17. A method for manufacturing a product, the method comprising:
analyzing operational states of a plurality of tools included in a production line for producing products, respectively, each of the operational states being assumed based on production information of the products, the production information including a production plan for the products;
extracting an operational period and a standby period of each of the tools, based on a result of the state analysis;
calculating a quantity of utilities consumed by each of the tools with respect to time, based on quantities of utilities consumed by each of the tools in operation and in standby during the operational periods and the standby periods;
designing at least any of a utility facility for supplying utilities to each of the tools and a utility facility for disposing of utilities discharged from each of the tools, based on the changes in the quantity of utilities consumed by all of the tools; and
manufacturing the products by use of the production line including the utility facility.

18. The method of claim 17, wherein the operational states of the tools is analyzed respectively by simulating a production line virtually.

19. The method of claim 17, further comprising:
designing piping through which the utility facility supplies utilities to each of the tools, based on layout information of the production line.

20. A computer program product stored on a computer readable medium of a computer and configured to be executed by a computer for designing a utility facility, the computer program product comprising:
instructions configured to analyze operational states of a plurality of tools included in a production line for producing products, respectively, each of the operational states being assumed based on production information of the products, the production information including a production plan for the products;
instructions configured to extract an operational period and a standby period of each of the tools, based on a result of the state analysis;
instructions configured to calculate changes in a quantity of utilities consumed by each of the tools with respect to time, based on quantities of utilities consumed by each of the tools in operation and in standby during the operational periods and the standby periods; and
instructions configured to design at least any of a utility facility for supplying utilities to each of the tools and a utility facility for disposing of utilities discharged from each of the tools, based on the changes in the quantity of utilities consumed by all of the tools.

* * * * *